US010586065B2

(12) United States Patent
Claes

(10) Patent No.: US 10,586,065 B2
(45) Date of Patent: Mar. 10, 2020

(54) METHOD FOR SECURE DATA MANAGEMENT IN A COMPUTER NETWORK

(71) Applicant: Fujitsu Technology Solutions Intellectual Property GmbH, München (DE)

(72) Inventor: Heinz-Josef Claes, München (DE)

(73) Assignee: Fujitsu Technology Solutions Intellectual Property GmbH, München (DE)

( * ) Notice: Subject to any disclaimer, the term of this patent is extended or adjusted under 35 U.S.C. 154(b) by 251 days.

(21) Appl. No.: 15/674,048

(22) Filed: Aug. 10, 2017

(65) Prior Publication Data
US 2018/0053009 A1 Feb. 22, 2018

(30) Foreign Application Priority Data

Aug. 16, 2016 (DE) .................... 10 2016 115 193

(51) Int. Cl.
*G06F 21/00* (2013.01)
*G06F 21/62* (2013.01)
(Continued)

(52) U.S. Cl.
CPC ........ *G06F 21/6218* (2013.01); *G06F 21/602* (2013.01); *H04L 9/085* (2013.01);
(Continued)

(58) Field of Classification Search
CPC ............... G06F 21/602; G06F 21/6218; G06F 2221/2107; G06F 2221/2151;
(Continued)

(56) References Cited

U.S. PATENT DOCUMENTS

2010/0125730 A1* 5/2010 Dodgson ................ G06F 21/62
713/153
2011/0282834 A1* 11/2011 Desai ................. G06F 11/2097
707/611
(Continued)

FOREIGN PATENT DOCUMENTS

DE 10 2014 112 478 12/2015
WO WO-2008004248 A1 * 1/2008 ......... H04L 63/0209

OTHER PUBLICATIONS

"Offene Ports," https://de.wiki.ubuntuusers.de/Offene_Ports/, Feb. 2015 with English abstract.
(Continued)

*Primary Examiner* — Joseph P Hirl
*Assistant Examiner* — Ka Shan Choy
(74) *Attorney, Agent, or Firm* — DLA Piper LLP (US)

(57) ABSTRACT

A method for secure data management in a computer network includes automatically calculating a key from a predetermined number of key fragments of a predetermined length for an encryption of data, encrypting data of a data set to be protected by the calculated key, dividing the data set into a predetermined number of data subsets, wherein the above steps are carried out by at least one processing computer system from a group of processing computer systems, and transmitting the key fragments and the data subsets to a distributed protection system in the computer network, wherein in each case one or more key fragments and in each case one or more data subsets are transmitted respectively from the at least one processing computer system to in each case one entity from a plurality of entities of the distributed protection system in the computer network, and storing all transmitted key fragments and data subsets in the respective entities of the distributed protection system.

20 Claims, 4 Drawing Sheets

(51) Int. Cl.
*H04L 9/08* (2006.01)
*G06F 21/60* (2013.01)
*H04L 9/14* (2006.01)

(52) U.S. Cl.
CPC .......... *H04L 9/0861* (2013.01); *H04L 9/0869* (2013.01); *H04L 9/0894* (2013.01); *H04L 9/14* (2013.01); *G06F 2221/2107* (2013.01); *G06F 2221/2151* (2013.01)

(58) Field of Classification Search
CPC ... G06F 21/6209; H04L 9/085; H04L 9/0861; H04L 9/0869; H04L 9/0894; H04L 9/14; H04L 9/0428; H04L 63/062
See application file for complete search history.

(56) References Cited

U.S. PATENT DOCUMENTS

| | | | |
|---|---|---|---|
| 2012/0221865 A1* | 8/2012 | Hahn | H04N 21/4331 713/193 |
| 2012/0243687 A1 | 9/2012 | Li et al. | |
| 2013/0010966 A1* | 1/2013 | Li | H04L 9/085 380/278 |
| 2016/0132684 A1 | 5/2016 | Barbas et al. | |
| 2016/0350551 A1* | 12/2016 | Chang | G06F 12/1408 |
| 2017/0220391 A1 | 8/2017 | Claes | |
| 2017/0222805 A1* | 8/2017 | Telford | H04L 9/0822 |

OTHER PUBLICATIONS

"Kryptographisch sicherer Zufallszahlengenerator," https://de.wikipedia.org/wiki/Kryptographisch_sicherer_Zufallszahlengenerator, Apr. 2016 with English abstract.

"Kryptologische Hashfunktion," https://de.wikipedia.org/wiki/Kryptologische_ Hashfunktion, Jun. 2016 with English abstract.

"Redundanz (Technik)," https://de.wikipedia.org/wiki/ Redundanz_(Technik), Jul. 2016, with English abstract.

"Replikation (Datenverarbeitung)," https://de.wikipedia.org/wiki/Replikation_(Datenverarbeitung), Feb. 2016 with English abstract.

\* cited by examiner

METHOD FOR SECURE DATA MANAGEMENT IN A COMPUTER NETWORK

TECHNICAL FIELD

This disclosure relates to a method for secure data management in a computer network.

BACKGROUND

In conventional data protection concepts, protection or recovery of data between a processing computer system that requires the data for processing in plaintext, and a protection system that includes, for example, one or more data servers, occurs through a password mechanism. In the processing computer system, a password is required that is used to encrypt or decrypt the respective data. Conventionally, the password must be entered in plaintext by a user of the processing computer system. This comes with the disadvantage that unauthorized third parties (criminals) may get access to the password, for example, by a keylogger, or that abuse may occur by a system administrator or another person with access to the processing computer system. Another disadvantage is that an authorized user, who knows the password, may be subject to bribery or blackmail and thus unauthorized third parties may also get access to the password.

It could therefore be helpful to provide for more secure data management in a computer network of the type mentioned above to protect the data as far as possible against manipulations.

SUMMARY

I provide a method for secure data management in a computer network, including automatically calculating a key from a predetermined number of key fragments of a predetermined length for an encryption of data, encrypting data of a data set to be protected by the calculated key, dividing the data set into a predetermined number of data subsets, wherein the above steps are carried out by at least one processing computer system from a group of processing computer systems, and transmitting the key fragments and the data subsets to a distributed protection system in the computer network, wherein in each case one or more key fragments and in each case one or more data subsets are transmitted respectively from the at least one processing computer system to in each case one entity from a plurality of entities of the distributed protection system in the computer network, and storing all transmitted key fragments and data subsets in the respective entities of the distributed protection system.

LIST OF REFERENCES

Figure 1:
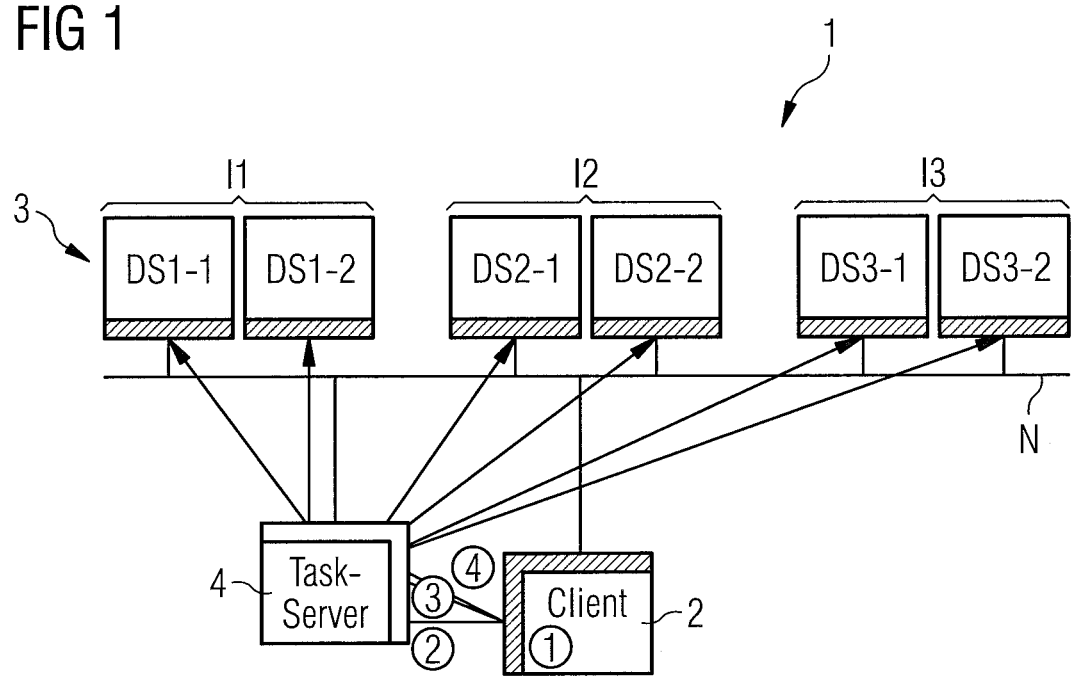
FIG. 1 shows a schematized representation of a portion of a computer network for data protection according to a first example.

1 computer network
2 processing computer system
3 distributed protection system
4 broker computer system
5 relay system
I1, I2, I3 entities of the distributed protection system
DS1-1 . . . DS3-2 sub-entities
N, N1 . . . N4 network

DETAILED DESCRIPTION

My method comprises the following steps for data protection:

automatically calculating a key from a predetermined number of key fragments of a predetermined length for an encryption of data, encrypting the data of a data set to be protected by the calculated key, dividing the data set into a predetermined number of data subsets, wherein the above steps are carried out by at least one processing computer system from a group of processing computer systems, and transmitting the key fragments and the data subsets to a distributed protection system in the computer network, with in each case one or more key fragments and in each case one or more data subsets of the at least one processing computer system being transmitted respectively to in each case one entity from a plurality of entities of the distributed protection system in the computer network, and storing all transmitted key fragments and data subsets in the respective entities of the distributed protection system.

Such a method is advantageous over conventional solutions in that, to encrypt a data set to be protected in an involved processing computer system, no password is required that has to be entered by a user of the processing computer system. Rather, for encryption of the data set to be protected, a key is calculated from a predetermined number of key fragments. This occurs in an automated manner in the at least one involved processing computer system. Regardless thereof, the access to a data set as well as the transmission of the data set can be protected by further measures.

These measures have the advantage that any manipulative access to a password entered by a user and/or other abuse of the password or any security-critical influence on an authorized user to obtain knowledge of the password is systematically prevented since such measures are neither provided nor required in the process explained herein.

Automatically calculating the key may, for example, occur according to a predetermined calculation method (cryptographic algorithm). The key fragments can, for example, be combined in a predetermined manner, for example, concatenated. There are, however, other possibilities of combination of the key fragments for the calculation of the key.

The key fragments are transmitted, same as the data subsets of the divided data set, to the distributed protection system in the computer network. This may, at first glance, look a little surprising, since in this way all key fragments of the key, with which the data of the data set have been encrypted, are stored jointly with the encrypted data in the distributed protection system. This procedure has, however, from the point of view of the processing computer system, the advantage that also for another decryption of the data set stored in a distributed manner, no password is required in the processing computer system that has to be entered by a user of processing computer system (with the advantages mentioned above). Rather, during data recovery, i.e., by loading all key fragments and all data subsets from the distributed protection system back into the involved processing computer system, the key can again automatically be calculated from the key fragments, by which the data of the combined data set can again be decrypted so that the data exist in plaintext in the processing computer system. This process occurs automatically and internally in the processing computer system. Here, too, the access to the data set as well as the transmission of the data set can be protected by further measures.

To secure a verification or authentication of the involved processing computer system(s), methods of a cryptographic authentication can be employed. For example, the admissibility of an involved processing computer system can be verified by a (qualified) signature of the processing computer system. It is also possible to verify the processes of the exchange of data between the group of the processing computer systems and the distributed protection system by (if applicable, multiple) signed data packets. For example, it may be provided that a respective data packet containing instructions from the group of the processing computer systems for the distributed protection system must be signed by several involved processing computer systems to confirm the integrity and admissibility of the data packet.

Such a decentralized, cumulative signature of a data packet considerably reduces attack options for the manipulation of the process, and the security of the method is further increased. Furthermore, advantageously, the entire information, in addition to the above measures, is (if applicable, multiply) encrypted by asymmetrical encryption methods between the involved computer systems and is thereby also protected.

Dividing the data set can be achieved by a predetermined procedure or according to predetermined rules. For example, the data set can be divided byte by byte into blocks. Alternatively, other block sizes are also possible. Further, the individual blocks can be subjected to certain permutations before they are transferred to the distributed protection system. By such measures, the composability can be hidden, and a reconstruction can be made difficult for potential attackers on the distributed protection system.

By dividing the data set into a predetermined number of data subsets and by transmitting the key fragments as well as the data subsets to the distributed protection system comprising a plurality of distributed entities, a particularly high degree of security of the data management is guaranteed. That is because in every entity of the distributed protection system, only a portion (one or several data subsets) of the original data set is stored in an encrypted form, or only a portion (one or several key fragments) for the calculation of the key is stored. When a criminal obtains manipulative access to an entity of the distributed protection system in the computer network, there will only be access to one or more encrypted data subsets that cannot be read, or to one or more key fragments, from which, without knowledge of the other key fragments, the criminal cannot reconstruct the key for encryption or decryption of the data set.

The distributed storage of the key fragments provides the advantage that a criminal, without further (high) efforts, will not obtain knowledge of the required key, even when he gets, with n key fragments, manipulative access to n-1 key fragments.

The division of the data set into data subsets and the distributed storage of the encrypted data subsets have the advantage that a criminal, even when overcoming the encryption (e.g., by taking advantage of a fault or a security vulnerability in the encryption algorithm, which per se does not require knowledge of the calculated key, to ultimately obtain the clear data set) without further (high) efforts, will not obtain knowledge of the clear data set, even upon obtaining, with n encrypted data subsets, manipulative access to n-1 encrypted data subsets.

The combination of features of the method has thus the overall advantage over conventional solutions that there is systematically no risk of a manipulative access to a password entered by a user for encryption or decryption of a data set for a data storage in a computer network and furthermore, by a distributed storage of all data (of the key fragments as well as of the correspondingly encrypted data subsets), a particularly high degree of security and robustness of the data management in the computer network against manipulations and attacks is guaranteed. By the distributed data management, also a possible spatial separation can be achieved so that physical access to different components of the distributed protection system is made difficult.

In the method steps explained above, one or more processing computer systems can be involved. In particular, the steps of the automated calculation of the key from the key fragments, the encryption of the data of the data set to be protected by the calculated key, and the division of the data set into the predetermined number of data subsets can be carried out in just one processing computer system or in several processing computer systems, in the latter case, for example, only one step each being performed in one processing computer system.

The distributed protection system can be provided such that there are different groups of entities, with one group of entities being provided for the storage of the key fragments only, and another group of entities being provided for the storage of the data subsets only. Alternatively or additionally, entities may however also be adapted such that there are stored one or more key fragments as well as one or more data subsets. A respective entity of the distributed protection system advantageously only stores data (one or more data subsets and/or one or more key fragments) that is not recorded in other entities. That is, a particular data subset or a particular key fragment is only recorded in a particular entity of the distributed protection system. Alternatively, however, it is possible that a particular data subset or a particular key fragment is recorded in more than one particular entity.

It is preferred, in the method of the described kind, however, that per entity only one of the key fragments or one of the data subsets is stored respectively. That is, in this special example, not several different key fragments or not several different data subsets are stored per entity. In this way, the key fragments and data subsets are distributed on a respectively maximum possible number of different entities, thus the security being increased. It is, however, alternatively possible that several different key fragments or data subsets are stored per entity.

The order of the steps of the encryption of the data of the data set to be protected by the calculated key and of the division of the data set into a predetermined number of data subsets may vary. It is, e.g., possible that first the entire data set (data) to be protected is encrypted by the calculated key and thereafter the encrypted data set is divided into the encrypted data subsets. Alternatively is possible that first the data set is divided into the respective data subsets and thereafter each data subset (data) is encrypted by the calculated key.

In an advantageous example of the method, the number of the data subsets corresponds to the number of the key fragments. Advantageously, prior to transmitting to the distributed protection system, in each case one key fragment is assigned to one data subset to form key fragment data subset pairs. Thereafter, in each case one key fragment data subset pair is transmitted to in each case one entity of the distributed protection system and is stored therein.

In this example, the steps explained above of the method comprise, therefore, the following modifications/additions:

assigning in each case one key fragment to in each case one data subset to form key fragment data subset pairs, transmitting the key fragment data subset pairs to a distributed protection system in the computer network, in each case one key fragment data subset pair of the at least one processing computer system being transmitted to in each case one entity from a plurality of entities of the distributed protection system in the computer network, and storing all transmitted key fragment data subset pairs in the respective entities of the distributed protection system.

An agreement of the number of the data subsets with the number of the key fragments has advantages for a secure data management. That is because, in this case, the key fragments that calculate the key and the data subsets of the divided encrypted data set are distributed respectively on the same number of entities of the distributed protection system. This means that for the key fragments as well as for the data subsets, an identical degree of security with respect to the distributed storage is given. When, for example, the key fragments as well as the data subsets are distributed on n entities, an attacker needs to obtain access to all of the n entities to obtain either knowledge of all key fragments for the calculation of the key or knowledge of all data subsets for the reconstruction of the data set in the case of a failure/overcoming/bypassing of the encryption algorithm (as explained above).

Advantageously, in general, the number of the data subsets is at least equal to the number of the key fragments. Otherwise, the method, however, only offers a level of security given by the smaller number of the data subsets. If the number of the data subsets is smaller than the number of the key fragments, then an attacker only needs to obtain access to the smaller number of the data subsets (which means smaller efforts than for access to the larger number of key fragments) and may thus get knowledge of the data set, if the encryption algorithm fails, or the attacker succeeds in overcoming or bypassing the encryption algorithm. If, however, as explained, the number of the data subsets is at least equal to the number of the key fragments, then the method is equally robust with respect to the efforts of a manipulative access to the data subsets and key fragments stored in a distributed manner.

Advantageously, in the method of the described kind, all key fragments are formed from a random number generated for this purpose. In this way, all key fragments are produced in an automated and random manner. The method requires, thus, no knowledge at all of any user of at least a few key fragments for the generation of the key. By that the key fragments are formed from random numbers, the calculation of the key from the random numbers is also random or is subject to the largest possible variety of combinations. Thereby, the smallest possible probability or the smallest possible risk of the correct determination of the key calculated from the key fragments is given. It is possible, with every new encryption of a data set or, e.g., after expiration of a predetermined period of time, date and the like, to newly generate the random numbers, from which the key fragments are formed, for another encryption.

The random numbers can be combined for the calculation of the key in a predetermined way, e.g., concatenated. There are possible, however, other possibilities of combinations. Thereafter, a checksum can be calculated from this combination. The calculated checksum then forms the key for encryption of the data.

Advantageously, the length, that is the character length, of the respective key fragments is at least equal to the length (character length) of the calculated key. This means that the individual key fragments are each extended or "inflated" at least to the length of the key itself. In this way, the probability of the correct determination of a respective key fragment is at least as low as the correct determination of the key per se. In other words, each key fragment, per se, is as robust against brute-force attacks as the calculated key itself.

If, for example, an attacker has, with n different key fragments, knowledge of n-1 key fragments, then the probability of the correct determination of the last missing key fragment is at least as low as the correct determination of the key itself. In this way, even the knowledge of n-1 key fragments will it not make easier for an attacker to calculate the corresponding key since the efforts for the calculation of the still missing key fragment are at least equal to the calculation of the key itself The length of the respective key fragments may also be larger, in particular many times larger, than the key length. In this case, the individual key fragments are even more robust against brute-force attacks than the key itself.

Advantageously, in the method of the described kind, after encrypting the data set to be protected into the encrypted data set, the key in the processing computer system that has calculated the key, is deleted again. In this way, the key is only temporarily present in the processing computer system, when the data set to be protected is encrypted. Also after a corresponding data recovery, that is after decrypting a data set recovered on the corresponding processing computer system, the key calculated from the key fragments can be deleted again. Thus, it is prevented that the key is permanently present in the processing computer system.

In this way, it is made difficult for an attacker on the processing computer system to get access to the key itself, since an attacker can obtain knowledge of the key in the (short) periods of time only, when the key is present in the processing computer system, namely during the encryption or decryption of a data set to be protected or to be recovered. Such measures increase, thus, the security of the data management in view of a robustness of the processing computer system against manipulations.

Advantageously, at least all key fragments and, if applicable, also all data subsets are encrypted with one or more second keys. The one or the more second keys differ, advantageously, from the above key calculated from the individual key fragments. The additional encryption with the one or the more second keys occurs, advantageously, prior to transmitting the key fragments or the data subsets to the distributed protection system within the processing computer system.

The measure of another encryption of the key fragments and, if applicable, of the data subsets with at least one additional key permits a protection against a readability of the encrypted data set after the storage in the distributed protection system. This prevents that a storage administrator, who obtains access to the entire distributed protection system, who has, however, no knowledge of the second key, can read the data set by accessing to all data (key fragments and data subsets) in the distributed protection system. Encryption of all key fragments and, if applicable, also of all data subsets with an additional key prior to transmitting the data to be protected into the distributed protection system permits, thus, in general a protection against unauthorized access to the data by persons having access to the entire distributed protection system.

Further, by the described additional encryption of the key fragments or of the data subsets prior to transmitting or storing in the distributed protection system, it can be achieved that only certain receivers on the sides of the group of the processing computer systems, who have specific knowledge of the second key, can recover and decrypt the data set stored in a distributed manner. In this way, a selectivity of users or individual specific processing computer systems can be achieved that are authorized to recover the data stored in a distributed manner in clear data.

An additional encryption with one or more second keys of the mentioned kind can be a symmetrical or asymmetrical encryption (private/public key).

Advantageously, the method of the described kind comprises the additional steps for the data recovery:

requesting the respective key fragments and the respective data subsets in the respective entities of the distributed protection system upon instruction of one from the group of the processing computer systems that wishes to recover the data set, transmitting the respective key fragments and the respective data subsets of the respective entities of the distributed protection system to at least one from the group of the processing computer systems, assembling the data subsets to the data set, combining the key fragments and calculating the key from the combined key fragments, and decrypting the encrypted data of the data set by the calculated key in the instructing processing computer system.

In this way, the data set stored in a distributed manner in an instructing processing computer system can be recovered.

If the division of the encrypted data set during a data protection of the kind described above has been performed according to a predetermined procedure or according to predetermined rules, then, of course, this procedure or these rules have to be employed again for a data recovery of the processing computer system(s) to assemble the data subsets stored in a distributed manner correctly to form the final data set.

It is possible to first assemble all data subsets to the encrypted data set, and thereafter decrypt the assembled encrypted data set by the key calculated from the key fragments. It is, however, alternatively also possible, to first separately decrypt all data subsets with the key calculated from the key fragments, and thereafter combine them to the encrypted data set.

Analogous to the above explanations in the context of a data protection, in the mentioned measures of the data recovery, one or more processing computer systems may be involved. For example, it is possible to perform one or more of the steps of the assembly of the data subsets to the complete data set, of the combination of the key fragments, of the calculation of the key from the combined fragments, and of the decryption of the encrypted data set by the calculated key, in different processing computer systems. Alternatively, it is also possible to perform all of the mentioned measures in one processing computer system.

Advantageously, in an example of the method, all entities of the distributed protection system as well as all processing computer systems from the group of the processing computer systems keep all network ports essential for the method closed such that an addressability of the entities of the distributed protection system or of the processing computer systems from outside, i.e., an establishment of a connection to these systems via a network, to transmit the respective key fragments and the respective data subsets, is prevented. For an exchange of the respective key fragments and the respective data subsets, however, at least one broker computer system is provided with at least one addressable open network port and is accessible via a network such that the entities of the distributed protection system or of the processing computer systems can have access to the broker computer system to store the respective key fragments or the respective data subsets in the broker computer system or fetch them from the broker computer system.

The entities of the distributed protection system and of the processing computer systems have the behavior of encapsulated (specially protected) systems. An access to these systems via a network is, at least under certain operation conditions (advantageously permanently during the execution of the method described here) not possible or is distinctly hampered.

Attempts to establish a connection of another computer system from outside to the respective entities of the distributed protection system or to the processing computer systems are, in this case, ignored or discarded by these systems. This can be achieved by specific rules for port filters, port blocking and/or firewall.

The term "all network ports essential for the method" means that in the entities of the distributed protection system and in the processing computer systems, all network ports that are required for a communication in the method described herein, are permanently or temporarily closed against establishing a connection from outside. This has the advantage that in the entities of the distributed protection system and in the processing computer systems, no programs or services are provided or available or necessary that, for the purpose of addressability or establishment of a connection from outside, listen to the corresponding network ports (so-called "listening") and, thus, would create a potential security vulnerability (e.g., for buffer overflow or DoS attacks or so-called distributed DoS attacks). Thus, the term "closed network ports" means, in this context, that there are no "listening ports", that is no establishment of a connection from outside is admitted. A third party (attacker or cracker) is, in this case, not capable of authenticating himself or logging in from outside via network at the entities of the distributed protection system or at the processing computer systems, e.g., for Unix-based systems via a Secure Shell (SSH) daemon, a http service or other services/application or the like, or performing special actions on the entities of the distributed protection system or on the processing computer systems.

However, for a predetermined user group, local access to individual ones or all entities of the distributed protection system and/or to individual ones or all processing computer systems may be provided. For other third parties, however, a local access is prevented.

By this general isolation of the entities of the distributed protection system and the processing computer systems according to the described kind, thus, an attack via network is made difficult since a crucial attack option, namely current services or programs at opened ("listening") network ports of the respective systems, are prevented. Thus, for the described method, in particular security-critical data which, e.g., are locally processed as a data set on the processing computer systems or are stored in the entities of the distributed protection system as data subsets or key fragments, are protected against attacks.

Different from the entities of the distributed protection system and the processing computer systems, however, access to the at least one provided broker computer system from outside is possible. The broker computer system may then be accessible as an "open" system with at least one addressable open network port via network. This means that in the broker computer system, for example, programs are running and/or applications are prepared so that the entities of the distributed protection system or the processing computer systems establish, via the essential network ports, as explained above, a connection to the broker computer system and can have access to the broker computer system to store the respective key fragments or the respective data subsets in the broker computer system or fetch them from the broker computer system.

The entities of the distributed protection system and the processing computer systems are, thus, in view of the network ports essential for the method, provided such that no establishment of a connection from outside to these systems is admitted. However, the systems themselves can establish, via these network ports, a connection to the broker computer system since the latter, different from the entities of the distributed protection system and of the processing computer systems, is addressable from outside. Thus, the broker computer system serves as a mediator for a communication between the entities of the distributed protection system and of the processing computer systems, which, however, themselves are each encapsulated against establishing a connection from outside.

The exchange of the key fragments or of the data subsets between the entities of the distributed protection system and of the processing computer systems advantageously occurs in the form of so-called "task files". The task files can be provided to carry out predetermined processes (in particular data storage in the entities of the distributed protection system and data requests or data recovery in a processing computer system).

For data protection, an involved processing computer system provides a task file prepared therefor or specifically generated with information (data to be protected or instructions for data protection). The data to be protected contain in particular one or more key fragments or one or more data subsets respectively. A compilation of the information occurs in the task file locally in the protected processing computer system without access possibility via network from outside. Thus, confidential data within the processing computer system remain protected against attacks of remote computer systems of non-authorized third parties or criminals. Thereafter, the task file is encrypted, advantageously signed with a signature of the processing computer system, and transmitted to the broker computer system. It is possible that one or more other processing computer systems transfer the task file from the broker computer system to themselves and perform specific actions on the task file. For this purpose, a process can be triggered that calls the selected task file in the broker computer system and automatically transmits it from the broker computer system to the respective processing computer system. The mentioned actions may, e.g., be the addition of other instructions or an additional signature for verification. After carrying out an action in a processing computer system, the task file is transmitted back to the broker computer system.

Furthermore, then an entity of the distributed protection system can have access to the broker computer system so that the task file is transmitted from the broker computer system to the entity of the distributed protection system. For this purpose, again a process can be triggered that calls the selected task file in the broker computer system and automatically transmits it from the broker computer system to the entity of the distributed protection system. Advantageously, the automated transmission of the task file from the broker computer system to the entity of the distributed protection system is configured such that third parties from outside have no influencing possibilities and, thus, a risk of manipulations of the entity of the distributed protection system through the task file is excluded.

In the entity of the distributed protection system, then the validity of the task file can locally be verified. Manipulations (if possible) of the content of the task file on the broker computer system, for example, by an attacker from outside, will advantageously only lead to an error message within the entity of the distributed protection system, which, for example, is recorded by monitoring.

Thereafter, then the information contained in the task file can be further processed within the entity of the distributed protection system, in particular the one or more key fragments or the one or more data subsets can be stored respectively. It is crucial that after transmitting the task file to the entity of the distributed protection system, all processes are carried out locally in the encapsulated entity of the distributed protection system without usual access or attack options of remote computer systems by third parties.

By a task file explained above or the at least one broker computer system of the kind described above, in this way, a communication between the involved processing computer systems and the entities of the distributed protection system is possible, although these, as explained above, do not allow an establishment of a connection from outside.

To initiate an onward transfer of a corresponding task file, a broker computer system may perform, for example, a port knocking process with respect to an involved processing computer system or with respect to an entity of the distributed protection system to advise this system of the existence of a task file. Alternatively or additionally, an involved processing computer system or an entity of the distributed protection system may also trigger by itself a request to the broker computer system about the existence of a task file to be fetched (polling).

To transmit the task file from the broker computer system to the processing computer system or to an entity of the distributed protection system, the latter can then establish by itself a connection to the broker computer system and transmit the task file to itself. This can, for example, be achieved under Unix by the command "scp" (secure copy).

It is practical for the method described here to store, within the task files, routing information for the routing process of the data between the group of the processing computer systems, one or a plurality of broker computer systems and the plurality of the entities of the distributed protection system. It is possible, for different directions of communication, to generate different task files with corresponding direction-dependent routing information or to use a task file with, if applicable, correspondingly prepared or adapted routing information.

In an advantageous example of the method, all entities of the distributed protection system are configured in a redundant manner and include each at least two sub-entities, the respective key fragments and the respective data subsets being stored in a redundant manner in the respective sub-entities of the distributed protection system. A redundant configuration of the distributed protection system and a redundant storage of the data in the respective sub-entities allows a high reliability or a high availability of the protection system.

Advantageously, in an example of the method, a data replication of the stored data subsets is carried out between the sub-entities of a respective entity of the distributed protection system.

The method explained above and further advantageous aspects are described in the following with reference to several examples with the aid of figures.

FIG. 1 shows a schematized representation of at least a portion of a computer network 1 for data protection according to a first example. Computer network 1 comprises a processing computer system 2 (client), a distributed protection system 3 with exemplarily three entities I1, I2, and I3 including in each case two sub-entities (DS1-1, DS1-2, DS2-1, DS2-2, DS3-1, DS3-2) for the redundant storage of data, and a broker computer system 4 (task server). All systems connect via a network N for communication with each other. The sub-entities (DS1-1, DS1-2, DS2-1, DS2-2, DS3-1, DS3-2) of distributed protection system 3 are each configured as data servers.

Entities I1 to I3 of distributed protection system 3, specifically all sub-entities (DS1-1, DS1-2, DS2-1, DS2-2, DS3-1, DS3-2), and processing computer system 2 keep all network ports essential for the method closed such that an addressability, i.e., an establishment of a connection from outside to entities I1 to I3 (sub-entities DS1-1, DS1-2, DS2-1, DS2-2, DS3-1, DS3-2) of distributed protection system 3 or to processing computer system 2 via network N is prevented (compare hatched in- and outputs at distributed protection system 3 and at processing computer system 2 in FIG. 1).

In contrast to distributed protection system 3 and processing computer system 2, broker computer system 4 comprises at least one addressable open network port and is accessible via network N such that entities I1 to I3 of distributed protection system 3 as well as processing computer system 2 can have access to the broker computer system 4, i.e., can establish a connection to the broker computer system 4 to store information or data in the broker computer system 4 or to fetch them from the broker computer system 4. Establishment of a connection from the respective entities I1 to I3 or from processing computer system 2 to the broker computer system 4 can, e.g., be triggered by that the broker computer system 4 initiates a port knocking process at predetermined closed network ports of the respective entities I1 to I3 or of processing computer system 2 to advise these systems that certain data/information are or is present in the broker computer system 4. Thereafter, then the respective entities I1 to I3 or processing computer system 2 can establish in each case one connection to the broker computer system to fetch the data/information.

In the following, a method for data protection in computer network 1 according to FIG. 1 is described in several steps 1 to 4 (compare numbering in FIG. 1).

In step 1, exemplarily three random numbers are generated in processing computer system 2. The quantity of the random numbers corresponds to the later division of the data to be protected in distributed protection system 3, as is described further below. The quantity of the random numbers may, however, differ from the number of the divisions.

The three generated random numbers are combined with each other (e.g., concatenated). From this combination is formed a checksum. This checksum is used as a key or passphrase for the symmetrical encryption of data to be protected of a data set in processing computer system 2.

A data set that contains the data, is present in processing computer system 2 and, for purposes of protection, is to be stored in distributed protection system 3, is symmetrically encrypted with the key into an encrypted data set. The encrypted data set is thereafter divided into three data subsets (e.g., byte by byte or according to another suitable method with, for example, a different block size). The three random numbers are assigned to the data subsets to form three random number data subset pairs. By an additional (optional) asymmetrical encryption (public key/private key) of the three random number data subset pairs, it can further be achieved that the information can later be read by particular receivers. The (if applicable, additionally encrypted) random number data subset pairs are embedded in one or more task files. It makes sense to embed each random number data subset pair in a separate task file since a following transport is to be achieved to different entities of the distributed protection system. In the task files, instructions or predetermined routing information for the transport and the processing of the task files may also be contained. For authentication, the task files are signed by processing computer system 2 and are (optionally) once again encrypted.

The three random number data subset pairs are—embedded in corresponding task files—transmitted, in the following steps 2 to 4, to the assigned entities I1 to I3. For this purpose, the processing computer system 3 establishes a connection to the broker computer system 4 and stores the task files in the broker computer system 4. Thereafter, the respective entities I1 to I3 or specifically the sub-entities DS1-1, DS1-2, DS2-1, DS2-2, DS3-1, DS3-2 thereof (if applicable, triggered by a preceding port knocking process by the broker computer system 4) can each establish connections to the broker computer system 4 and fetch the respective task files and further process them locally.

Specifically occurs, in step 2 of FIG. 1, a transmission of a task file with a random number data subset pair to entity I1 (with sub-entities DS1-1 and DS1-2 thereof), in step 3 a transmission of another task file with another random number data subset pair to entity I2 (with sub-entities DS2-1 and DS2-2 thereof), and in step 4 a corresponding transmission of the third task file with the third random number data subset pair to entity I3 (with sub-entities DS3-1 and DS3-2 thereof). In this way, after carrying out these measures, all random number data subset pairs are then distributed on entities I1 to I3 and are stored there each in a redundant manner in sub-entities DSx-1 and DSx-2. Steps 2 to 4 can be carried out in parallel.

To make sure that the information is stored in a redundant manner, the information can be sent from processing computer system 2 each separately to the individual sub-entities DSx-1 and DSx-2 or can be transported, by a predetermined definition in the corresponding task file by a 1:2 transmission (generally 1:n for n sub-entities), directly to the sub-entities. The redundancy on the transmission path in the latter case is guaranteed, for example, by a redundant configuration of the transport route.

After carrying out the data protection, the key is deleted for the encryption of the data set in processing computer system 2.

Figure 2A:
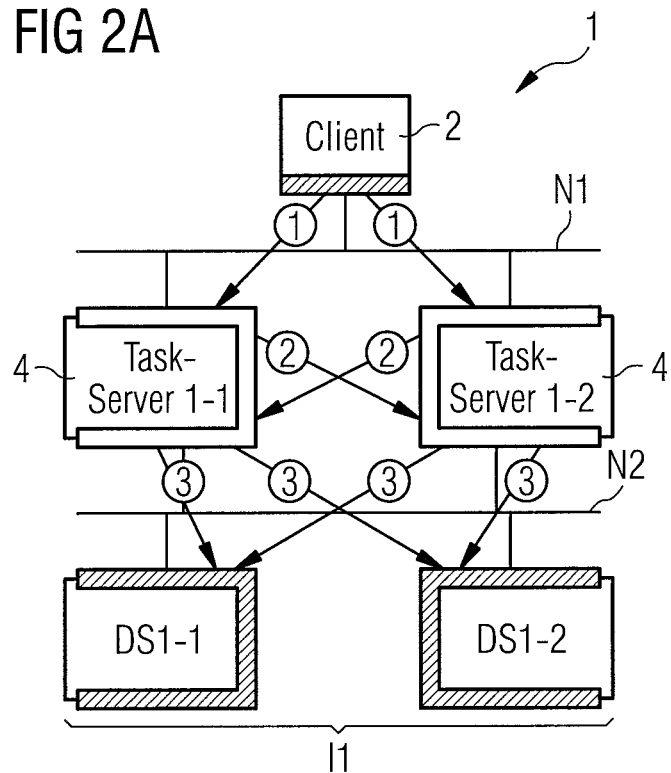
FIG. 2A shows a schematized representation of a portion of a computer network for data protection according to another example.

FIG. 2A shows a schematized representation of a portion of a computer network 1 for data protection according to another example. Herein, only a portion configured in a redundant manner of distributed protection system 3 (in particular sub-entities DS1-1 and DS1-2 of entity I1) is shown. For the other components I2 or I3 exemplarily shown in FIG. 1, with sub-entities DS2-1, DS2-2, DS3-1 and DS3-2 thereof, apply the processes shown here in an analogous manner.

FIG. 2A shows, in a scheme, the interconnection of processing computer system 2 with entity I1 (sub-entities DS1-1 and DS1-2) of distributed protection system 3 (cf. FIG. 1) through two broker computer systems (task server 1-1 and task server 1-2). The two broker computer systems (task server 1-1 and task server 1-2) are connected via a network N1 to processing computer system 2 and via a network N2 to sub-entities DS1-1 and DS1-2. In this way, computer network 1 is configured in a highly available manner. The transport via the redundant connections can be achieved by directly using the same or by another method (e.g., bonding). The redundancy of the broker computer systems (task server 1-1 and task server 1-2) could, for example, also be implemented by a cluster software.

FIG. 2A shows the redundant storage of a data set (by the task files described above). The data are transported in a redundant manner to both data servers (sub-entities DS1-1 and DS1-2) and are stored there. In the figure, the storage is shown without back channel (confirmation). Herein, monitoring of the actions takes place by a correspondingly configured monitoring process. As a variation of this method, a confirmation can also be achieved in the form of a task file sent back from sub-entities DS1-1 and DS1-2.

Further, in FIG. 2A detailed method steps 1 to 3 (see numbering in FIG. 2A) for the redundant, highly available storage of the task files (cf. above explanations to FIG. 1) in entity I1 are shown and described in more detail in the following.

In a step 1 occurs a parallel transmission of a task file from processing computer system 2 by a network connection respectively to the broker computer systems task server 1-1 and task server 1-2.

In a respective step 2, task servers 1-1 and 1-2 (e.g., after waiting a random period of time) verify, whether the corresponding task file is completely present on the respectively other computer system. For this purpose, for example, task server 1-1 can send a request to task server 1-2 and vice versa. If step 2 indicates that in one of these two broker computer systems the task file is not present (e.g., since a transmission from processing computer system 2 has failed), then the verifying broker computer system (for example, task server 1-1 versus task server 1-2 or vice versa) becomes active according to a routing process previously determined from the task file and transmits a copy of the task file to the broker computer system, in which the task file previously was not present (for example, task server 1-2).

In this way, task server 1-2 can, for example, be included again, by task server 1-1, in the communication and forward transfer of task files, even when a transmission of a task file from processing computer system 2 to task server 1-2 has failed.

In another step 3, finally, both task servers 1-1 or 1-2 verify, whether or not the task file has already successfully been transmitted to the respective sub-entities DS1-1 or DS1-2 (by the respectively other broker computer system). After sub-entities DS1-1 or DS1-2, with the network ports closed for this purpose, have been encapsulated, task server 1-1 or 1-2 direct one port knocking process each to sub-entities DS1-1 or DS1-2, and they test by themselves, whether the task file is already present on sub-entities DS1-1 or DS1-2. If in one or both sub-entities DS1-1 or DS1-2 of the task file is not yet present, the corresponding sub-entities DS1-1 or DS1-2 fetch, in step 3, the task file from the respective task server 1-1 or 1-2 respectively.

Figure 2B:
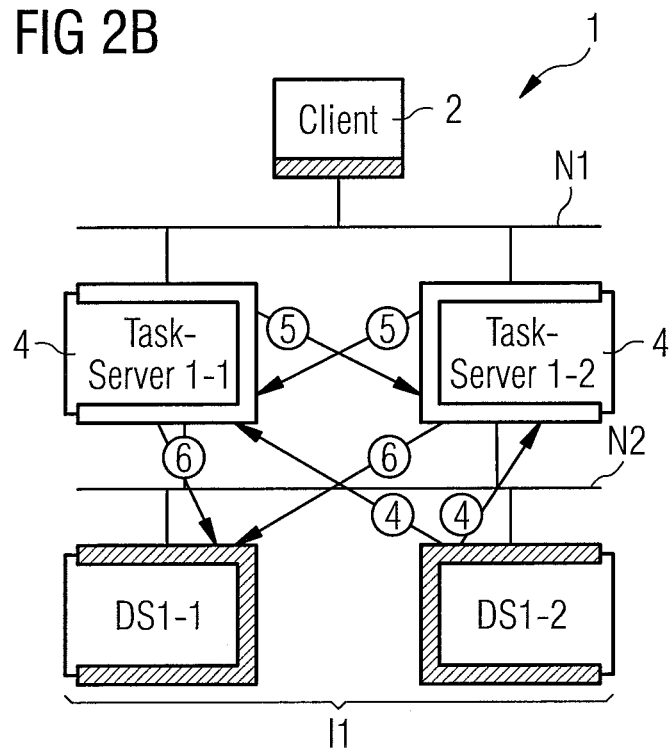
FIG. 2B shows the computer network according to FIG. 2A for the replication of data.

FIG. 2B shows the computer network 1 according to FIG. 2A for the replication or synchronization of data between sub-entities DS1-1 or DS1-2 of entity I1. The transport protocol used here delivers task files, as shown, in a redundant manner. In the case of interruptions in the process, this occurs also later for the desired sub-entity DS1-1 or DS1-2. There are, however, also cases possible, where a task file does not arrive on one of redundant sub-entities DS1-1 or DS1-2, or sub-entities DS1-1 or DS1-2 themselves have physical defects (or do not perform under all conditions in the way they should), and therefore the data stock on the two sub-entities DS1-1 or DS1-2 is inconsistent.

For this reason, according to FIG. 2B, replication of the data between sub-entities DS1-1 or DS1-2 is carried out. As a relevant feature for the up-to-datedness of a task file or an information stored in the task file (e.g., of a random number data subset pair), e.g., a time stamp for the generation on the processing computer system may be used. The time stamp may, e.g., be precise to the nearest 1 ns. The replication can be triggered with each modification of the information between sub-entities DS1-1 or DS1-2 or also of the entire data set stored in distributed protection system 3. Alternatively, a synchronization in certain time intervals is possible. Further, the combination of the two methods can be employed, i.e., for example, a synchronization after n seconds (minutes, hours) at the latest, after the last synchronization has been initiated. Optionally, an automatic synchronization after the (re-)start of a sub-entity DS1-1 or DS1-2 can also be achieved.

In particular, a replication or synchronization between the two sub-entities DS1-1 or DS1-2 in several method steps 4 to 6 (compare numbering in FIG. 2B) is described in the following. In a step 4, exemplarily, sub-entity DS1-2 sends the task file received in the previous process steps and being (from its point of view) the most up-to-date one to the two broker computer systems task server 1-1 and task server 1-2. The up-to-datedness of the task file can be detected, as explained above, for example, by using a time stamp stored in the task file. For the transmission of the data during the replication, the data are advantageously encrypted by a public key of the received sub-entity DS1-1 or DS1-2, in order that they can only be read by that one.

In a step 5, task servers 1-1 and 1-2 verify (e.g., after waiting a random period of time), whether the task file sent by sub-entity DS1-2 is completely present on the respectively other computer system. For this purpose, for example, task server 1-1 can send a request to task server 1-2 and vice versa. If step 5 results in that in one of these two broker computer systems, the task file is not present (e.g., since a transmission from sub-entity DS1-2 has failed), the verifying broker computer system (for example, task server 1-1 versus task server 1-2 or vice versa) becomes active according to a routing process previously determined from the task file and transmits a copy of the task file to the broker computer system, in which the task file previously was not present (for example, task server 1-2).

In another step 6, again both task servers 1-1 or 1-2 verify, whether or not the task file has already successfully been transmitted to the other sub-entity DS1-1 (by the respectively other broker computer system). For this purpose, task servers 1-1 or 1-2 direct in each case one port knocking process to sub-entity DS1-1, and the latter verifies by itself whether or not the task file is present. If the task file is not yet present, sub-entity DS1-1 will fetch the task file from the respective task server 1-1 or 1-2.

Within sub-entity DS1-1, the task file (that originates from sub-entity DS1-2) can be harmonized with the already present data stock, with the more up-to-date data stock being maintained and older data being stored in an archive or discarded directly or after a certain period of time.

A reversed process starting from sub-entity DS1-1 in the direction of sub-entity DS1-2 makes of course also sense. If further sub-entities DS1-3 to DS1-n exist, the method of the replication described here can be applied in an analogous manner to all these entities. This can be achieved, for example, by step-by-step pair-wise replication or by replication after a previous "total analysis". In this way, all the sub-entities of an entity I1 to I3 of distributed protection system 3 replicate or synchronize their data. The processes have the advantage that in case of a difference in time for a data storage and/or of a temporary failure of a sub-entity, nevertheless the respectively most up-to-date data stock can be secured in a redundant and highly available manner in distributed protection system 3.

Figure 3A:
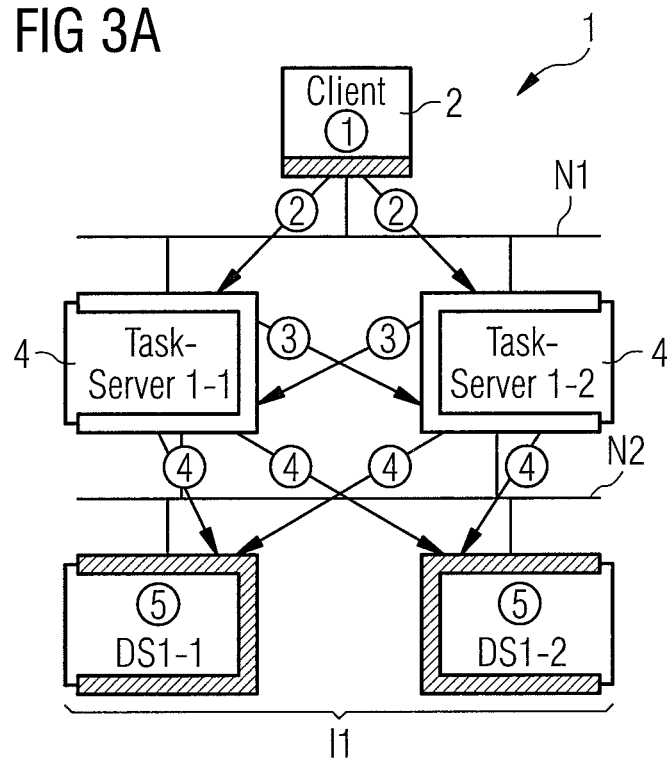
FIG. 3A shows the computer network according to FIG. 2A for the request of a stored data set.

FIG. 3A shows a schematized representation of the computer network according to FIG. 2A for the request of a data set stored in a distributed manner according to the processes shown above in several method steps 1 to 5 (cf. numbering). In FIG. 3A, as in FIGS. 2A and 2B, only a portion of distributed protection system 3 configured in a redundant manner (in particular sub-entities DS1-1 and DS1-2 of entity I1) is shown. For the further components I2 or I3 exemplarily shown in FIG. 1 with their sub-entities DS2-1, DS2-2, DS3-1 and DS3-2, the processes shown here apply in an analogous manner.

In step 1 according to FIG. 3A, one or more task files are generated in processing computer system 2 for the request of the protected data set and are signed with a qualified signature for the authentication of processing computer system 2 and optionally encrypted. Advantageously, for every random number data subset pair to be requested in a sub-entity DS1-1 or DS1-2 (cf. explanations in FIG. 1), a task file is generated. It is alternatively possible to request the random number data subset pairs through one single task file. This can be adapted specifically for the process.

The generated task files contain, inter alia, information about the respective storage path (location) of the random number data subset pairs stored in the distributed protection system. In this way, it can be determined, which data are to be delivered back from distributed protection system 3.

Further, the task files contain information about a routing process for the forward path (i.e., from processing computer system 2 to the respective sub-entities, here DS1-1 and DS1-2) and if applicable, for the backward path (i.e., from the respective sub-entities, here DS1-1 and DS1-2, back to processing computer system 2). Herein, optionally, different methods can be used:

Using the same task files with definition stored therein of a routing process for the forward path as well as for the backward path. This requires that all involved redundant sub-entities are achieved via the same network N, i.e., that the IP address routing the routing process is based on can be used in an identical manner.

Figure 4:
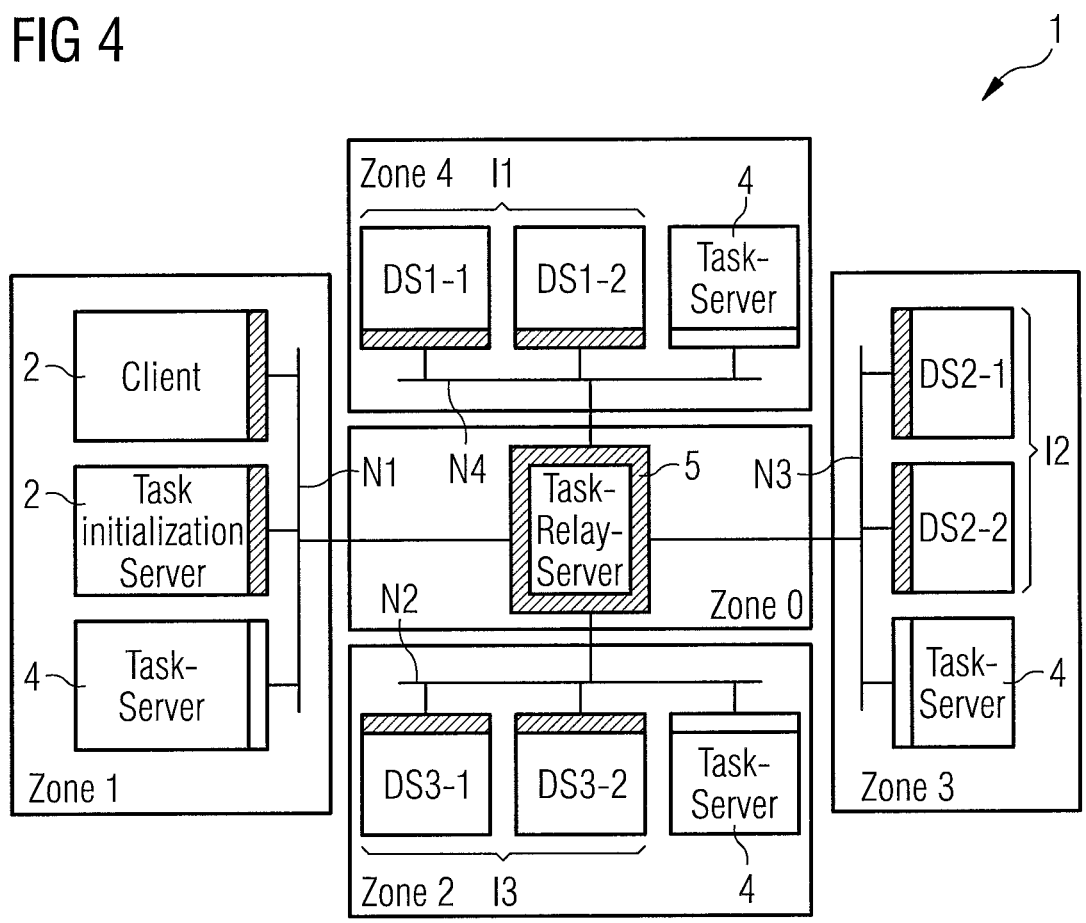
FIG. 4 shows a schematized representation of a portion of a computer network for data protection according to a third example.

Using the same task files for the forward path as well as for the backward path, when sub-entities are connected to the network on different paths (e.g., separately in different networks of different security zones, cf. FIG. 4). In this case, different configurations of routing have to be defined specifically for individual transport or communication paths (e.g., transmission according to a distribution 1:n).

Generating and sending another task file specially configured for the backward path in the respective sub-entities. Of the initial task file of processing computer system 2, then at least the routing process and the information about the content of the request are adopted to enable an identification of the sent-back data in processing computer system 2. For the routing process, here a difference may also be made, whether or not the backward path of the data server components is identical.

The task files generated in processing computer system 2 are sent, in step 2, to broker computer systems 4 (task server 1-1 or task server 1-2), which again allow an establishment of a connection by sub-entities DS1-1 and DS1-2 for the onward transfer of the task files to the sub-entities.

In step 3, to increase redundancy, the transmission between broker computer systems 4 takes place. In step 4, the task files are then transmitted to sub-entities DS1-1 and DS1-2. In step 5, the authentications are verified through the signatures of the task files and, with positive verification, the desired data (through the information supplied in the respective task files) are determined. Sub-entities DS1-1 and DS1-2 arrange the information required for the identification of the request (e.g., time stamp of the request) and the desired random number data subset pair and embed this information in the respective task files or generate a new task file with the corresponding information. The routing back to processing computer system 2 can, e.g., be adopted from the initial task file of the requesting processing computer system 2, in the form of an embedded task file that has been sent by processing computer system 2, or by further using the request task file of processing computer system 2 that already contains the description for the back routing.

Figure 3B:
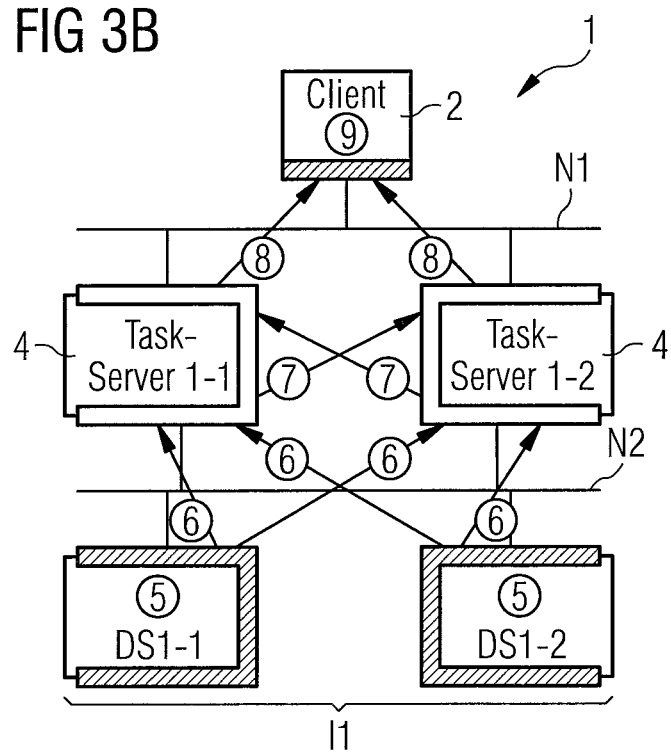
FIG. 3B shows the computer network according to FIG. 3A for a backward transfer of a stored data set or for the confirmation of the protection of a data set to be stored.

FIG. 3B illustrates the backward transfer of the requested information, i.e., here specifically of the random number data subset pair stored in a redundant manner in sub-entities DS1-1 and DS1-2, to the requesting processing computer system 2. It is additionally also possible to employ the mechanism additionally shown also for the confirmation of the successful protection of a data set to be stored.

In step 6, in FIG. 3B, the task files adapted or generated by sub-entities DS1-1 and DS1-2 are transmitted to the broker computer systems 4 (task server 1-1, task server 1-2). They are then, in step 7, sent for increasing redundancy between the broker computer systems 4 and thereafter, in step 8, transmitted to processing computer system 2. Depending—as described above—on the chosen routing process, then the assignment of the information sent back in a redundant manner by sub-entities DS1-1 and DS1-2 takes place in processing computer system 2.

The described processes are achieved for all entities I1 to I3 of distributed protection system 3 in an analogous manner so that ultimately all random number data subset pairs stored in a distributed manner are transmitted back to processing computer system 2. In processing computer system 2, then the individual random numbers can again be combined, and the corresponding key can be calculated (cf. explanations to FIG. 1). Further, the data subsets can be assembled and decrypted with the calculated key (step 9). It is also possible, to first decrypt all data subsets with the calculated key and thereafter to assemble them.

FIG. 4 shows a schematized representation of a portion of a computer network 1 for data protection according to another possible topology. Herein, the individual components are divided into different (physically and/or logically) separated security zones (zone 1 to 4). The components of every security zone connect via corresponding networks N1 to N4. A high availability in the sense of redundant paths is not shown in FIG. 4, for reasons of clarity, and can, however, be implemented as described above.

In zone 1 is also shown, in addition to processing computer system 2 (client), another processing computer system 2 (task initialization server). For example, the client can have access, by broker computer system 4 in zone 1, to the task initialization server to request a particular job (task).

A relay system 5 in a central zone 0 establishes a bridging of a communication between the individual security zones. The relay system 5 includes, in an analogous manner to processing computer systems 2 (in zone 1) and sub-entities DS1-1 to DS3-2 of distributed protection system 3 (distributed on the zones 2 to 4), closed network ports (see hatched in- and outputs). This means that in an analogous manner to the above explanations, no establishment of a connection from outside to the relay system 5 is possible. However, the relay system 5 itself can establish a connection to the broker computer systems 4 in the respective zones 1 to 4 to fetch data from there or to store them there and to enable an event-controlled communication within the structure. If applicable, for the further protection against manipulations, it is also possible to implement, by the relay system 5, a protocol change of a communication between the individual security zones 1 to 4.

By such a special protection of the relay system 5, the topology is specially protected against attacks extending beyond the zones. Nevertheless, the relay system 5 acts as a kind of router for the forward transfer of information between the individual security zones.

A process sequence for the distributed data protection or recovery between processing computer systems 2 and the further components of the distributed protection system occurs in an analogous manner to the measures shown above in the context of FIGS. 1 to 3B.

In further modifications of the method shown here, the key fragments (random numbers) in the involved processing computer systems optionally can be hashed, with only the hash values of the key fragments being transmitted and stored to protect the data stored in the distributed protection system as far as possible against abuse. The drawback of this method is that it will no longer be possible to request a list of the key fragments stored in the distributed protection system in plaintext, in order, e.g., to sort out ones no longer needed. To circumvent this problem, optionally, a list of all key fragments stored in the distributed protection system could per se be stored in a distributed manner.

Since, in the methods of the kind described herein, all actions are stored in task files in a cryptographically secured manner, the individual data (data subsets and key fragments) can be recorded on entities (data servers) provided therefor. Further, the task files and the information embedded therein can be employed for an audit process or for an n-eye process.

What is claimed is:

1. A method for secure data management in a computer network comprising:
   automatically calculating a key from a predetermined number of key fragments of a predetermined length for an encryption of data,
   encrypting data of a data set to be protected by the calculated key,
   dividing the data set into a predetermined number of data subsets,
   wherein the above steps are carried out by at least one processing computer system from a group of processing computer systems, and
   transmitting the key fragments and the data subsets to a distributed protection system in the computer network, wherein in each case one or more key fragments and in each case one or more data subsets are transmitted respectively from the at least one processing computer system to in each case one entity from a plurality of entities of the distributed protection system in the computer network, and
   storing all transmitted key fragments and data subsets in the respective entities of the distributed protection system,
   wherein all entities of the distributed protection system as well as all processing computer systems from the group of the processing computer systems permanently keep all network ports essential for the method closed such that an addressability of the entities of the distributed protection system or the processing computer systems via a network to transmit the respective key fragments and the respective data subsets is permanently prevented,
   wherein, however, for the exchange of the respective key fragments and of the respective data subsets at least one broker computer system with at least one addressable open network port is provided and accessible via the network,
   the respective key fragments or the respective data subsets are compiled into one or more task files locally in the at least one processing computer system and the one or more task files are signed with a signature of the at least one processing computer system and are transmitted to the broker computer system, and
   the respective entities of the distributed protection system as well as the at least one processing computer system respectively establish a connection to the broker computer system and access the broker computer system to store the one or more signed task files in the broker computer system or fetch them from the broker computer system.

2. The method of claim 1, wherein the number of the data subsets corresponds to the number of the key fragments, and prior to transmitting to the distributed protection system, in each case one key fragment is assigned to in each case one data subset to form key fragment data subset pairs, wherein thereafter in each case one key fragment data subset pair is transmitted to in each case one entity of the distributed protection system and is stored there.

3. The method of claim 2, wherein all key fragments are respectively formed from a random number generated for this purpose.

4. The method of claim 2, wherein the length of the respective key fragments is at least equal to the length of the calculated key.

5. The method of claim 2, wherein after the encryption of the data set to be protected into the encrypted data set, the key in the processing computer system that has calculated the key is deleted.

6. The method of claim 2, wherein at least all key fragments and, if applicable, also all data subsets are encrypted with one or more second keys.

7. The method of claim 1, wherein all key fragments are respectively formed from a random number generated for this purpose.

8. The method of claim 7, wherein the length of the respective key fragments is at least equal to the length of the calculated key.

9. The method of claim 7, wherein after the encryption of the data set to be protected into the encrypted data set, the key in the processing computer system that has calculated the key is deleted.

10. The method of claim 7, wherein at least all key fragments and, if applicable, also all data subsets are encrypted with one or more second keys.

11. The method of claim 1, wherein the length of the respective key fragments is at least equal to the length of the calculated key.

12. The method of claim 11, wherein after the encryption of the data set to be protected into the encrypted data set, the key in the processing computer system that has calculated the key is deleted.

13. The method of claim 11, wherein at least all key fragments and, if applicable, also all data subsets are encrypted with one or more second keys.

14. The method of claim 1, wherein after the encryption of the data set to be protected into the encrypted data set, the key in the processing computer system that has calculated the key is deleted.

15. The method of claim 14, wherein at least all key fragments and, if applicable, also all data subsets are encrypted with one or more second keys.

16. The method of claim 1, wherein at least all key fragments and, if applicable, also all data subsets are encrypted with one or more second keys.

17. The method of claim 1, further comprising:
requesting the respective key fragments and the respective data subsets in the respective entities of the distributed protection system upon instruction of one from the group of the processing computer systems that wishes to recover the data set,
transmitting the respective key fragments and the respective data subsets of the respective entities of the distributed protection system to at least one from the group of the processing computer systems,
assembling the data subsets to the data set,
combining the key fragments and calculating the key from the combined key fragments, and
decrypting the encrypted data of the data set by the calculated key in the instructing processing computer system.

18. The method of claim 1, wherein all entities of the distributed protection system are configured in a redundant manner and each comprise at least two sub-entities, and the respective key fragments and the respective data subsets are stored in a redundant manner in the respective sub-entities of the distributed protection system.

19. The method of claim 18, wherein between the sub-entities of a respective entity of the distributed protection system, a data replication of the stored data subsets is performed.

20. A method for secure data management in a computer network comprising:
automatically calculating a key from a predetermined number of key fragments of a predetermined length for an encryption of data,
encrypting data of a data set to be protected by the calculated key,
dividing the data set into a predetermined number of data subsets, wherein the above steps are carried out by at least one processing computer system from a group of processing computer systems, and
transmitting the key fragments and the data subsets to a distributed protection system in the computer network, wherein in each case one or more key fragments and in each case one or more data subsets are transmitted respectively from the at least one processing computer system to in each case one entity from a plurality of entities of the distributed protection system in the computer network, and
storing all transmitted key fragments and data subsets in the respective entities of the distributed protection system,
wherein the respective entities of the distributed protection system, the group of processing computer systems and a group of broker computer systems are divided into different physically and/or logically separated security zones, wherein the group of processing computer systems are arranged together with at least one of the group of broker computer systems in a first security zone and each one of the entities of the distributed protection system is arranged together with at least one other of the group of broker computer systems respectively in other security zones separated from the first security zone,
a relay system is centrally arranged in a separate central security zone and establishes a bridging of a communication between the individual security zones,
all entities of the distributed protection system, all processing computer systems from the group of the processing computer systems as well as the relay system permanently keep all network ports essential for the method closed such that an addressability of the entities of the distributed protection system, the processing computer systems or the relay system via a network to transmit the respective key fragments and the respective data subsets is permanently prevented,
wherein, however, for the exchange of the respective key fragments and of the respective data subsets the group of broker computer systems each have at least one addressable open network port and is accessible via the network,
the respective key fragments or the respective data subsets are compiled into one or more task files locally in the at least one processing computer system and the one or more task files are signed with a signature of the at least one processing computer system and are transmitted to respective broker computer systems from the group of broker computer systems, and
the respective entities of the distributed protection system, the at least one processing computer system as well as the relay system respectively establish a connection to respective broker computer systems from the group of broker computer systems and access the respective broker computer systems to store the one or more signed task files in the broker computer systems or fetch them from the broker computer systems.

* * * * *